(12) United States Patent
Antanaitis et al.

(10) Patent No.: US 9,416,835 B2
(45) Date of Patent: Aug. 16, 2016

(54) METHOD OF ESTIMATING BRAKE PAD WEAR AND VEHICLE HAVING A CONTROLLER THAT IMPLEMENTS THE METHOD

(71) Applicant: GM GLOBAL TECHNOLOGY OPERATIONS LLC, Detroit, MI (US)

(72) Inventors: David B. Antanaitis, Northville, MI (US); Mark T. Riefe, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/540,048

(22) Filed: Nov. 13, 2014

(65) Prior Publication Data

US 2016/0138665 A1 May 19, 2016

(51) Int. Cl.
| | |
|---|---|
| *B60T 8/172* | (2006.01) |
| *F16D 66/02* | (2006.01) |
| *F16D 66/00* | (2006.01) |
| *B60T 17/22* | (2006.01) |
| *B60Q 1/00* | (2006.01) |

(52) U.S. Cl.
CPC ............ *F16D 66/026* (2013.01); *F16D 66/027* (2013.01); *B60Q 1/00* (2013.01); *B60T 17/22* (2013.01); *F16D 2066/001* (2013.01); *F16D 2066/006* (2013.01)

(58) Field of Classification Search
CPC .... F16D 65/12; F16D 65/0006; B60T 17/221
USPC ...................... 701/70; 188/1.11 L; 73/115.07
See application file for complete search history.

(56) References Cited

U.S. PATENT DOCUMENTS

| | | | | |
|---|---|---|---|---|
| 5,372,221 | A * | 12/1994 | Jalbert .................... | B60T 17/22 188/1.11 L |
| 7,694,555 | B2 * | 4/2010 | Howell .................. | B60T 17/221 73/129 |
| 7,957,875 | B2 * | 6/2011 | Antanaitis ............... | B60T 8/172 188/1.11 R |
| 8,151,944 | B2 * | 4/2012 | Waltz ........................ | B60T 5/00 188/1.11 E |
| 8,949,016 | B1 * | 2/2015 | Ferguson ............... | B60W 30/00 340/436 |
| 2005/0212357 | A1 * | 9/2005 | Adams .................... | B60T 17/18 303/122.03 |
| 2009/0187320 | A1 * | 7/2009 | Antanaitis ............... | B60T 8/172 701/70 |

\* cited by examiner

*Primary Examiner* — Thomas G Black
*Assistant Examiner* — Wae Louie
(74) *Attorney, Agent, or Firm* — Quinn Law Group, PLLC (57) ABSTRACT

A method of estimating brake pad wear includes determining required braking energy to be dissipated by a braking system as a fraction of total kinetic energy according to an energy partitioning model. The required braking energy is distributed to vehicle braking mechanisms according to a vehicle dynamics model. Rotor temperature of each brake rotor may be determined according to a rotor temperature model that utilizes the required braking energy and the distribution of the required braking energy, and determining brake pad wear of each brake pad according to a brake pad wear model that utilizes the rotor temperature and the distributed required braking energy. A first brake pad wear model is implemented under first operating conditions, and a second brake pad wear model under second operating conditions. The brake pad wear is indicated via a brake pad wear indicator output device. A vehicle has a controller that implements the method.

14 Claims, 4 Drawing Sheets

METHOD OF ESTIMATING BRAKE PAD WEAR AND VEHICLE HAVING A CONTROLLER THAT IMPLEMENTS THE METHOD

TECHNICAL FIELD

The present teachings generally include a method of estimating brake pad wear and a vehicle having a controller that implements the method.

BACKGROUND

Brake pad life monitoring has been implemented on vehicles in various ways. Some vehicles have mechanical sensors that provide an audible sound when the brake pad wears sufficiently that the sensor contacts the brake rotor. Some vehicles have an electronic sensor that provides a one-time signal when brake pad wear reaches a predetermined amount of wear, and may indicate this to a vehicle operator as a percentage remaining brake pad life in a vehicle information center accessible on the dash board or steering wheel. A more advanced wear life algorithm estimates brake pad wear based on an estimated rotor temperature correlated with typical driving conditions requiring relatively low braking energy.

Some vehicle owners occasionally or routinely exhibit aggressive, high energy braking behavior either on public roads or during race track maneuvering. Race track operation of a vehicle requires attention to brake pad wear, as brake pads may tend to wear more quickly under the relatively high speed maneuvering. Visually inspecting brake pads during race track sessions is inconvenient, as "pit stop" time is extended.

SUMMARY

A method of estimating brake pad wear on a vehicle is accurate even under high energy braking conditions, such as under race track conditions. Brake pad wear rates change markedly under high energy braking conditions as new wear mechanisms of the brake pad are triggered. The brake pad wear rates are sensitive to vehicle dynamics under high energy braking conditions, as later weight transfer during combined braking and cornering will drive energy to the further outboard brakes. As used herein, an "outboard" component is generally further from a longitudinal center axis of the vehicle, while an "inboard" component is generally closer to the longitudinal center axis of the vehicle. An outboard direction is away from the longitudinal center axis, while an inboard direction is toward the longitudinal center axis. Factors such as aerodynamic drag, tire drag, and engine braking vary much more during high energy, race track driving conditions. Moreover, the method can optionally apply different models to determine brake pad wear dependent upon whether standard, relatively low energy or relatively high energy braking is occurring.

The method may include determining, via an electronic controller, required braking energy to be dissipated by a braking system of the vehicle as a fraction of total kinetic energy of the vehicle according to an energy partitioning model. A distribution of the required braking energy is then determined whereby the required braking energy is distributed to multiple vehicle braking mechanisms on the vehicle according to a vehicle dynamics model. The method may further include determining rotor temperature of each brake rotor according to a rotor temperature model that utilizes the required braking energy and the distribution of the required braking energy, and then determining brake pad wear of each brake pad according to a brake pad wear model that utilizes the rotor temperature and the distributed required braking energy. The method then includes indicating the brake pad wear via a brake pad wear indicator output device.

The energy partitioning model, the vehicle dynamics model, the rotor temperature model, and the brake pad wear model are representative of vehicle conditions when the rotor temperature is greater than a predetermined minimum rotor temperature, braking speed is greater than a predetermined minimum braking speed, and the required braking energy is greater than a predetermined minimum braking energy.

In one aspect, the method may switch between different brake pad wear models depending on various inputs such as rotor temperature. For example, the method may include determining, via an electronic controller, brake pad wear according to a first brake pad wear model when an estimated brake rotor temperature is less than or equal to a predetermined rotor temperature, and determining, via the electronic controller, brake pad wear according to a second brake pad wear model when the estimated brake rotor temperature is greater than the predetermined rotor temperature.

A vehicle that has a controller that implements the method includes a vehicle body operatively connected to rotatable wheels for moving the vehicle body, and a braking system configured to stop rotation of the wheels. The braking system includes respective braking mechanisms each operatively connected with a different respective one of the wheels. Each braking mechanism has a brake rotor rotatable with the wheel and a brake pad placed in contact with the brake rotor during braking of the wheel. An electronic controller has a processor that executes a stored algorithm that determines brake rotor temperature, and then determines brake pad wear according to a first brake pad wear model when the brake rotor temperature is less than or equal to a predetermined rotor temperature, and determines brake pad wear according to a second brake pad wear model when the estimated brake rotor temperature is greater than the predetermined rotor temperature. The brake pad wear is then indicated via a brake pad wear indicator output device.

The method reduces the frequency of brake inspections during track sessions as the controller-provided brake pad wear estimate or remaining life estimate can be relied on to accurately estimate brake pad wear under high energy braking conditions. This enables any visual inspections of the brake pads to be scheduled in a more discriminating manner (i.e., in better correlation to a need for pad replacement), and to be of shorter duration. As a quick inspection of only the highly visible outboard portion of the brake pad can be carried out to check correlation with the controller-provided estimate, and a time-consuming, full brake corner teardown is likely unnecessary. Moreover, the accuracy of everyday pad life prognostics is improved by the incorporation of the high energy model and "switching" logic between the standard brake pad wear model and the race track brake pad wear model to account for more extreme driving even on public roads. An accurate predictive algorithm avoids the need for expensive capacitance based transducers that can provide a physical measurement of brake pad wear, and improves upon the discreet (discontinuous) pad wear life predictions provided by electronic wear sensors.

The above features and advantages and other features and advantages of the present teachings are readily apparent from the following detailed description of the best modes for carrying out the present teachings when taken in connection with the accompanying drawings.

DETAILED DESCRIPTION

Figure 1:
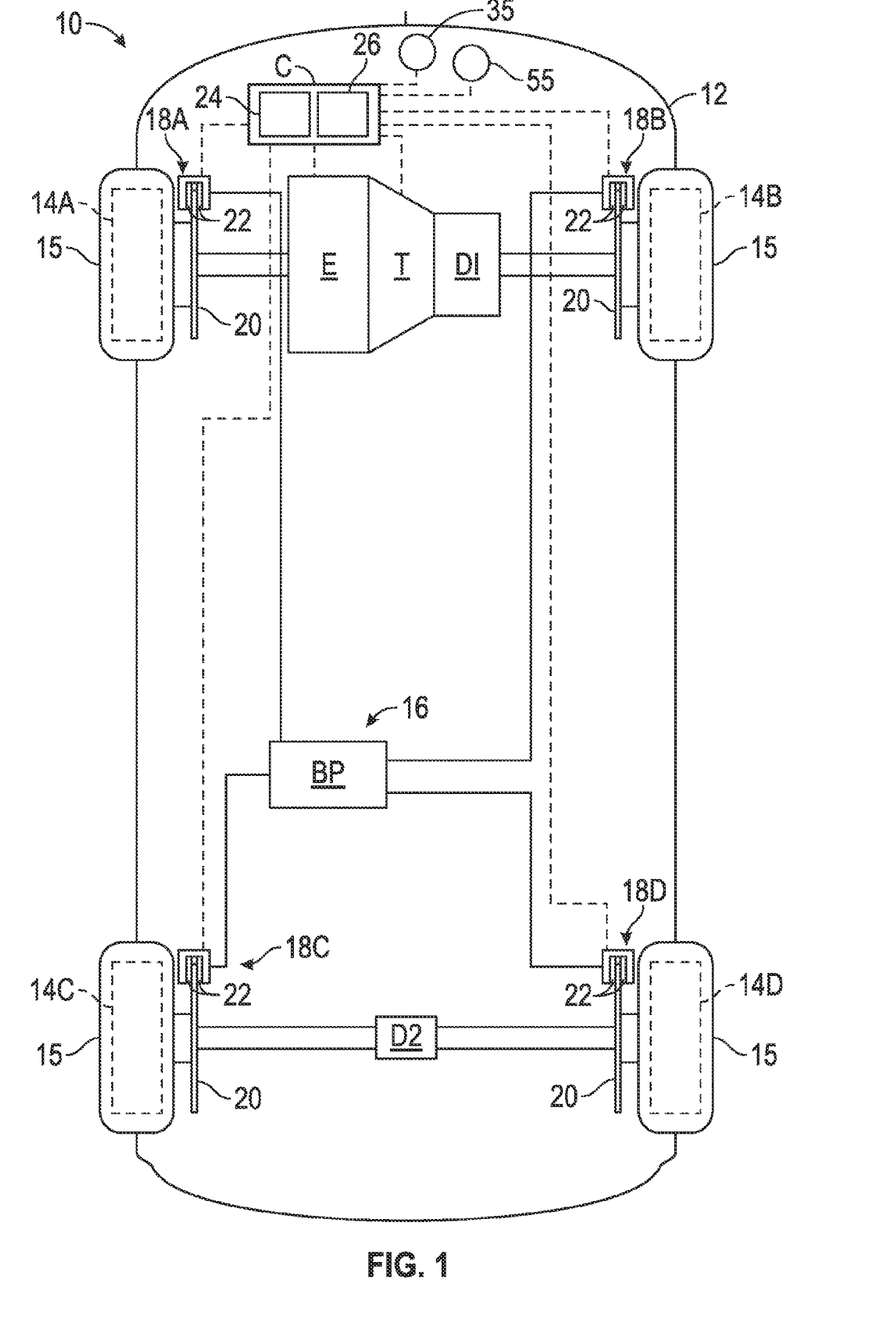
FIG. 1 is a schematic illustration of a vehicle.

Referring to the drawings, wherein like reference numbers refer to like components throughout the views, FIG. 1 shows a vehicle 10 that has a vehicle body 12 that is operatively connected to rotatable wheels 14A, 14B, 14C, 14D for moving the vehicle body 12 when propelled by an engine E via a transmission T. In one non-limiting example, the vehicle 10 is a front wheel-drive vehicle. Differential D1 operatively connects the front wheels 14A, 14B, and a differential D2 operatively connects the rear wheels 14C, 14D via half shafts as is known. Tires 15 are shown mounted on the wheels 14A, 14B, 14C, 14D. The vehicle 10 includes a braking system 16 that is configured to stop rotation of the wheels 14A, 14B, 14C, 14D. The braking system 16 includes a fluid pressure source BP in communication with respective braking mechanism 18A, 18B, 18C, 18D operatively connected with each respective wheel 14A, 14B, 14C, 14D. The braking mechanisms 18A, 18B, 18C, 18D each have a brake rotor 20 rotatable with the respective wheel 14A, 14B, 14C, 14D, and respective brake pads 22 placed in contact with opposite sides of the brake rotor 20 during braking.

An electronic controller C has a processor 24 that executes a stored algorithm 26 for determining brake pad wear and, accordingly, predicts remaining life of the brake pads 22, by accurately modeling wear even when the vehicle 10 is operated under relatively extreme driving, such as relatively high energy braking conditions. Additionally, the algorithm 26 determines whether predetermined high energy braking conditions exist, and automatically switches to a high energy brake pad wear model, referred to herein as a race track model, from a standard brake pad wear model that is more accurate under more typical driving with associated lower energy braking conditions.

Figure 2:
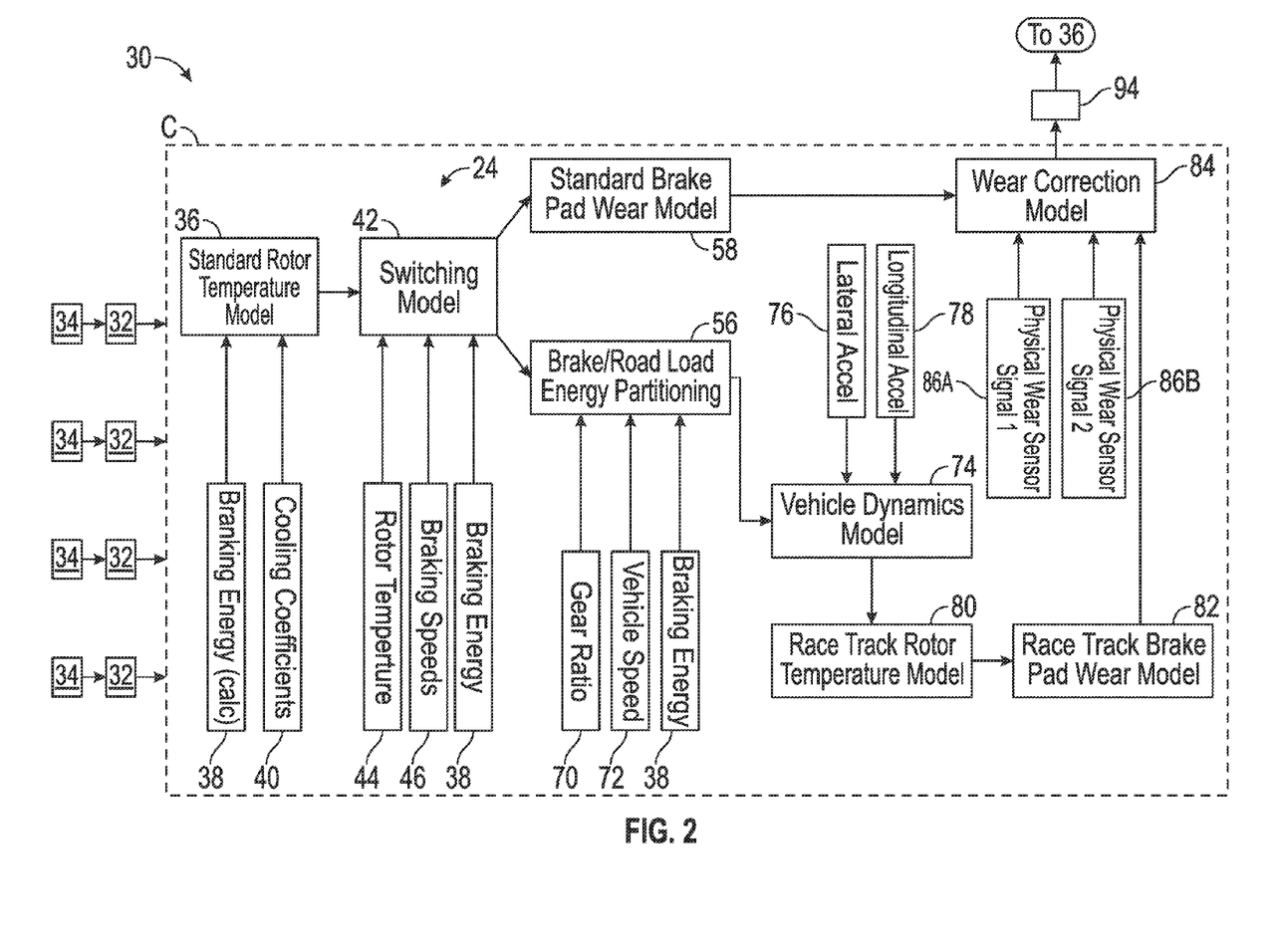
FIG. 2 is a schematic block diagram of a system for estimating brake pad wear on the vehicle of FIG. 1.

Referring to FIG. 2, a system 30 for estimating brake pad wear on the vehicle 10 includes various vehicle sensors 32, and includes the controller C that receives input signals from the sensors 32 so that the processor 24 can carry out the stored algorithm 26, represented as various modules each modeling aspects of the vehicle operation based on the sensor inputs, to produce a wear signal in a brake pad wear indicator output device 35, such as an operator display device or an audio signal. Although only four sensors 32 are depicted, many more sensors may be included in the system 30. The sensors 32 may include wheel speed sensors, brake pressure sensors, and other sensors and the input from the sensors 32 may include brake pressure, wheel speeds, vehicle speed, longitudinal acceleration, dynamic brake proportioning, brake apply. Various systems 34 may provide input signals, including vehicle systems and offboard systems, such as telematics systems, global positioning systems, map information. Based on the input from the sensors 32 and systems 34, the controller C can estimate or calculate vehicle mass, road grade, amount of engine braking, braking energy, rolling resistance, appropriate rotor cooling coefficients, lateral and longitudinal acceleration, and other vehicle operating characteristics as described herein.

It should be appreciated that the electronic controller C may be configured as a single or distributed control device that is electrically connected to or otherwise placed in hard-wired or wireless communication with the engine E, the transmission T, the braking system 16, and various vehicle components, including sensors, for transmitting and receiving electrical signals for proper execution of the algorithm 26.

The electronic controller C includes one or more control modules, with one or more processors 24 and tangible, non-transitory memory, e.g., read-only memory (ROM), whether optical, magnetic, flash, or otherwise. The electronic controller C may also include sufficient amounts of random access memory (RAM), electrically-erasable programmable read-only memory (EEPROM), and the like, as well as a high-speed clock, analog-to-digital (A/D) and digital-to-analog (D/A) circuitry, and input/output circuitry and devices (I/O), as well as appropriate signal conditioning and buffer circuitry.

The electronic controller C can be a host machine or distributed system, e.g., a computer such as a digital computer or microcomputer, acting as a vehicle control module, and/or as a proportional-integral-derivative (PID) controller device having a processor, and, as the memory, tangible, non-transitory computer-readable memory such as read-only memory (ROM) or flash memory. Therefore, the controller C can include all software, hardware, memory, algorithms, connections, sensors, etc., necessary to monitor the vehicle 10 and control the system 30. As such, one or more control methods executed by the controller C can be embodied as software or firmware associated with the controller C. It is to be appreciated that the controller C can also include any device capable of analyzing data from various sensors, comparing data, and making decisions required to monitor brake pad wear and alert the vehicle operator of brake pad life. Moreover, the electronic controller C can be configured in different embodiments to include a brake controller, a powertrain controller, and other controllers onboard or offboard the vehicle 10.

The algorithm 26 begins by determining rotor temperature according to a standard rotor temperature model 36. The standard rotor temperature model 36 utilizes a calculation of braking energy 38 and a first set of cooling coefficients 40 for a thermal temperature model of the brake pads 22. The calculated braking energy 38 and cooling coefficients 40 are appropriate (i.e., substantially accurate) for vehicle operating conditions with relatively low energy braking, typical of standard driving conditions, as further described herein. Accordingly, the first rotor temperature model 36 utilizes a calculated braking energy 38 and an equation for heat transfer from each rotor 20 that utilizes cooling coefficients 40 selected to correlate with the standard driving conditions.

The cooling rate of the rotors 20 when they are not in use helps determine the brake pad temperature, and is dependent on the mass of the rotor 20, vehicle design, vehicle speed, wheel speed, ambient temperature, altitude, etc. As the vehicle 10 moves, the air flowing around each rotor 20 will determine how fast it is cooled from the previous braking event. The cooling coefficients 40 used in the lumped capacitance model of temperature decay (Equation 1) are selected to be correlated with relatively standard driving conditions with rotor temperature below a predetermined rotor temperature, vehicle speed below a predetermined vehicle speed, and braking energy below a predetermined braking energy. As further discussed herein, lower cooling coefficients are used when such driving conditions are not met (i.e., under high energy driving conditions for which a race track rotor temperature model is used to estimate rotor temperature).

The lumped capacitance model for brake rotor cooling is as follows:

$$\frac{dT}{dt} = -b(T - T_a) + D(1); \quad (1)$$

$$D = \frac{P_d}{\rho V c} \quad (2)$$

where $P_d$ is brake residual drag, $\rho$ is the density of the rotor material, V is the volume of the rotor material, and c is the specific heat capacity of the rotor material. The term b is the "cooling coefficient" and is equal to:

$$\frac{hA}{\rho V c} \quad (3)$$

where h is the convective heat transfer coefficient and A is the working area (exposed to convective cooling airflow). Cooling coefficients are measured in vehicle tests by recording the cooling rate of the brake rotors and fitting the lumped capacitance model to the recorded data. Cooling coefficients vary approximately linearly with vehicle speed. Cooling coefficients may be measured at discrete speeds, and may then a linear model may be fit to the data to determine cooling coefficients at any speed. Typical cooling coefficient values will vary by brake rotor design and vehicle environment. An example cooling coefficient versus vehicle speed relationship could be:

$$b = 0.00033V + 0.0033 \quad (4)$$

where V is the vehicle forward velocity in kilometers per hour.

The calculated braking energy 38 used in the rotor temperature model 36 is an estimate of the braking energy dissipation in the braking mechanisms 18A, 18B, 18C, 18D. This calculation uses various inputs, such as stopping distance, stopping time, brake pad temperature, etc. The master cylinder pressure of the braking system 16, the weight distribution in the vehicle 10 and the dynamic brake proportioning for the proportional brake pressure at each wheel 14A-14D can be used to determine the brake pressure. The dynamic brake proportioning is based on where the weight in the vehicle 10 is distributed, and is a known calculation. Vehicle mass can be estimated based on engine torque, and is a process well known to those skilled in the art. The mass of the vehicle 10 may change as a result of the number of passengers, load in the trunk, fuel capacity, etc. Further, those skilled in the art understand various ways to estimate the road grade in combination with the estimation of the vehicle mas.

The processor 24 can calculate the braking energy 38 for use in the standard rotor temperature model 36 by Equation (5) below. The braking energy 38 is the work done by the braking mechanisms 18A-18D to decelerate the vehicle 10, and is the total work minus the rolling resistance, the aerodynamic drag, the engine braking and the road grade. The brake work can be used to calculate the power dissipated by the braking mechanisms 18A, 18B, 18C, 18D, where power equals work per unit of time. The power can be calculated at predetermined time intervals during the braking event, for example, every 10 milliseconds.

$$\text{Braking Energy} = \frac{1}{2}M(V_1^2 - V_F^2) - E_{Rolling\ Resistance} - E_{Grade} - E_{Engine} \quad (5)$$

In Equation (5), M is the mass of the vehicle; $E_{Rolling\ Resistance}$ is the energy required to roll the vehicle 10 on a flat grade, which is a known value; $E_{Grade}$ is the energy required to roll the vehicle 10 as a result of the grade of the road, which is also a known value; $E_{Engine}$ is the braking provided by the engine E itself, and is also a known value; $V_1$ is the velocity of the vehicle 10 at the beginning of the braking event; and $V_F$ is the velocity of the vehicle 10 at the end of the braking event. In an alternate embodiment, vehicle 10 deceleration can be used instead of the vehicle speed V, and can be provided by a longitudinal acceleration sensor.

The total braking power dissipated by each brake pad 22 during the braking event can also be estimated as the product of braking force and vehicle velocity. Braking force can be calculated as:

$$\text{Braking Force} = \text{pressure} \times \text{area} \times \mu \quad (6)$$

Where $\mu$ is the friction coefficient of the brake pad 22, which is a function of the pad temperature, and area is the surface area of the brake pad 22. Alternately, the braking power can be calculated as:

$$\text{Braking Energy} = \left(\frac{\text{Torque}}{\text{Rolling Radius}}\right) \times \text{Velocity} \quad (7)$$

The torque is calculated for both the front and the rear of the vehicle 10 and is a function of the brake pressure and the dynamic brake proportioning. The Rolling Radius is the rolling radius of the wheel 14A, 14B, 14C, or 14D, and velocity is the vehicle velocity.

After an estimated rotor temperature is provided using the standard rotor temperature model 36, the algorithm 26 then proceeds to a switching model 42, which determines whether the first brake pad wear model (i.e., the standard brake pad wear model 58) or a second brake pad wear model (i.e., a high-energy braking brake pad wear model, referred to as the race track brake pad wear model 82) will be utilized. The switching model 42 makes the determination based at least partially on an estimated rotor temperature 44, braking speed 46, and calculated braking energy 38. The estimated rotor temperature 44 is initially from the standard rotor temperature model 36 from Equation (1) above, or may be from the race track rotor temperature model 80 after the algorithm 26 proceeds through that estimation. Braking speed is the same as wheel speed, and can be obtained from wheel sensors, or calculated based on sensor signals from an engine speed sensor, or a transmission output speed sensor. The calculated braking energy 38 can be as described in Equation (5) above.

Figure 3:
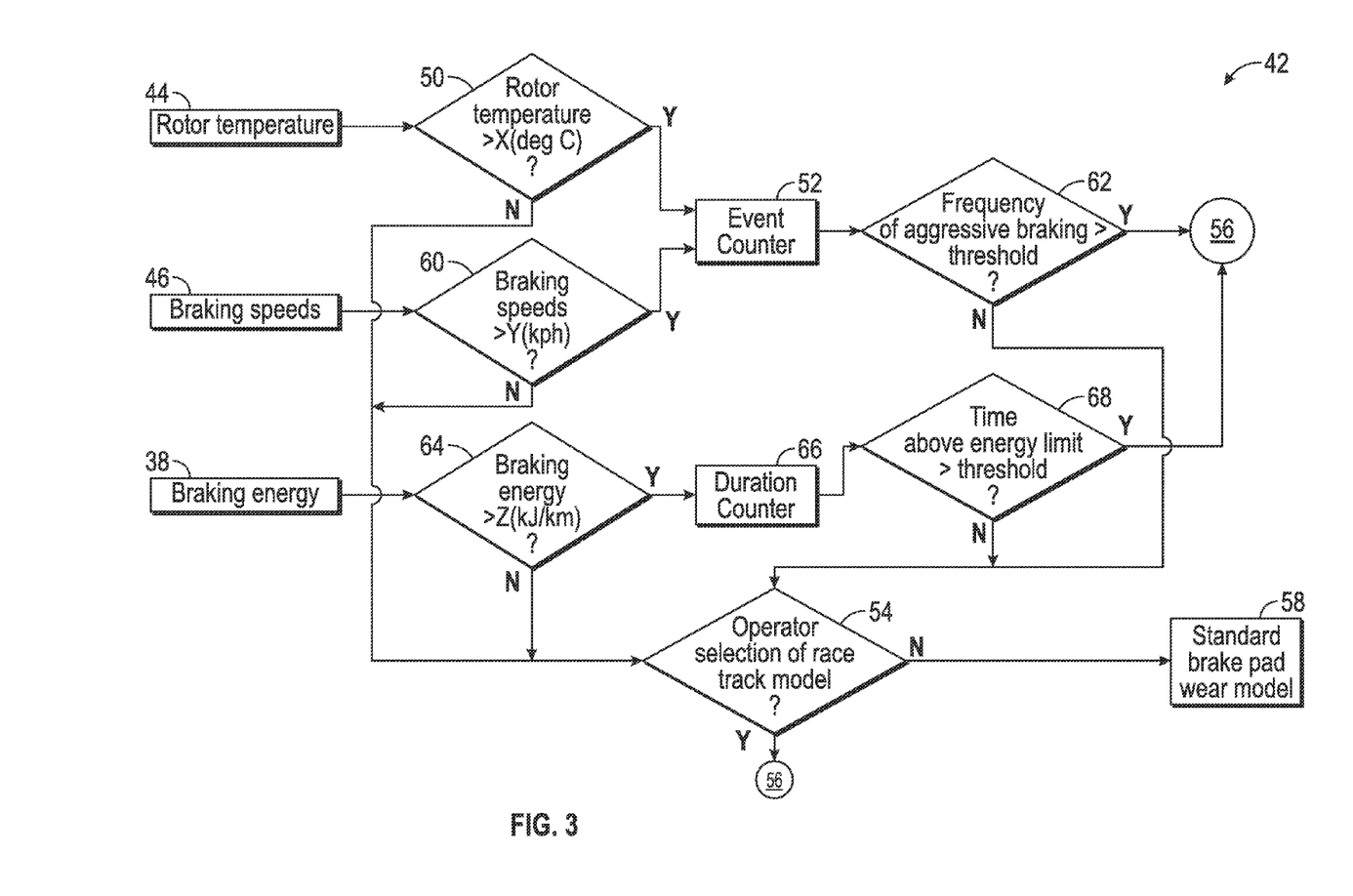
FIG. 3 is a schematic illustration of a switching model included in the system of FIG. 2.

More specifically, referring to FIG. 3, the switching model 42 considers the estimated rotor temperature 44, an estimated braking speed 46, and braking energy 38. The switching model 42 will only proceed to estimate rotor temperature according to the race track temperature model 80 under certain conditions. First, the race track temperature model 80 will be used when a predetermined minimum rotor temperature $RT_{MIN}$ or a predetermined minimum braking speed $BS_{MIN}$ are determined to be exceeded a predetermined number of times within a predetermined time period. In block 50 of the switching model 42, the estimated rotor temperature 44 is compared to the predetermined minimum rotor temperature X. If the estimated rotor temperature 44 is greater than the predetermined minimum rotor temperature X, then the switching model 42 proceeds to an event counter 52 and adds one event to the tally of events tracked by the event counter 52. If the estimated rotor temperature is less than or equal to the predetermined minimum rotor temperature X, then the count of the event counter 52 is not increased, and the switching model 42 proceeds to block 54 to determine whether a vehicle operator has selected the race track mode (i.e., the race track brake pad wear model 82) such as by depressing an operator input button 55, shown in FIG. 1, providing an audible command, or otherwise provided a signal indicating a selection of the race track mode. If it is determined that the race track mode has been selected, then the switching model 42 proceeds to block 56, as described further with respect to FIG. 2. Otherwise, the switching model 42 proceeds to block 58 to determine brake pad wear according to the standard brake pad wear model 58, discussed further herein, unless it is determined in block 54 that the vehicle operator has selected the race track brake pad wear model 82. The standard brake pad wear model 58 is also referred to herein as a first brake pad wear model or an alternative brake pad wear model, and the race track brake pad wear model 82 is also referred to herein as a second brake pad wear model or a high energy brake pad wear model.

Similarly, in block 60 of the switching model 42, the braking speed 46 is compared to the predetermined minimum braking speed Y. If the braking speed 46 is greater than the predetermined minimum braking speed Y, then the switching model 42 proceeds to the event counter 52 and adds one event to the tally of events tracked by the event counter 52. If the braking speed 60 is less than or equal to the predetermined minimum braking speed Y, then the count of the event counter 52 is not increased, and the switching model 42 proceeds to block 54 to determine whether a vehicle operator has selected the race track mode and, if so, then the switching model 42 proceeds to block 56, as described further with respect to FIG. 2. Otherwise, the switching model 42 proceeds to block 58 to determine brake pad wear according to the standard brake pad wear model 58.

If the switching model 42 proceeds to block 52 and adds an event to the counter, the switching model 42 then proceeds to block 62 to determine whether the frequency of increasing the count of the event counter in 52 is greater than a predetermined threshold frequency. The frequency of increasing the count is an indicator of the frequency of aggressive braking by the operator of the vehicle 10, as evidenced by the relatively high rotor temperature 44 and the relatively high braking speed 46 determinations of blocks 50 and 60. If the threshold frequency is exceeded, then modeling brake pad wear according to the race track brake pad wear model 82 is appropriate, and the switching model 42 proceeds to block 56 of FIG. 2. Otherwise, the switching model 42 proceeds to the standard brake pad wear model 58, unless it is determined in block 54 that the vehicle operator has selected the race track brake pad wear model, in which case the switching model 42 moves to block 56.

The switching model 42 also evaluates braking energy 38 as a separate potential indicator of the appropriateness of the race track brake pad wear model 82 or the standard brake pad wear model 58. In block 64, the switching model 42 determines whether braking energy 38 exceeds a predetermined minimum braking energy. If so, the switching model 42 proceeds to block 66 to determine how long the braking energy 38 remains greater than the predetermined minimum braking energy Z. If it is determined in block 68 that the predetermined minimum braking energy Z is exceeded for longer than a predetermined minimum period of time, then the switching model 42 proceeds to block 56 of FIG. 3 to determine brake pad wear according to the race track brake pad wear model 82. Otherwise, the switching model 42 determines brake pad wear according to the standard brake pad wear model 58, unless it is determined in block 54 that the vehicle operator has selected the race track brake pad wear model.

Referring again to FIG. 2, if the switching model 42 has proceeded to the standard brake pad wear model 58, then brake pad wear is determined according to a mathematical relationship of brake pad wear to rotor temperature that is most accurate in relatively low braking energy operating conditions (i.e., during a normal operating mode, not during driving on a race track or with other similar high energy driving maneuvers). Under the standard brake pad wear model 58, the algorithm 26 inputs the applied braking force into a physical thermal model for first order dynamics to determine an estimate of the rotor temperature. Brake pad dynamometer tests can be used to obtain the brake pad friction coefficient as a function of rotor temperature and the amount of wear expected at each pad temperature.

Under the standard brake pad wear model 58, the force required to stop the vehicle can be estimated as:

$$\text{Force} = \text{mass} \times \text{acceleration} \tag{8}$$

The front/rear brake proportioning information and the cornering information available from the controller C can be used to determine the power distribution on each axis and corner. The vehicle mass estimation is available from the controller C, and is also used in these equations. From the braking energy or the braking power, the brake pad temperature can be determined as a proportional value, and from the brake pad temperature, the brake pad wear can be determined as a proportional value, typically from a look-up table in the processor 24. Those skilled in the art would readily understand how to provide a look-up table that was populated based on the relationship between the braking energy and the brake pad temperature and the brake pad temperature and the brake pad wear based on the calculations discussed above and the properties of the brake pad 22. Each time the algorithm 26 calculates the wear of the brake pad 22, it is added to the previous calculations of wear over time, and can then be extrapolated from the vehicle mileage to determine the remaining mileage for each brake pad 22.

Alternatively, if the switching model 42 proceeds to block 56 as discussed with respect to FIG. 3, then the algorithm 26 estimates brake pad wear according to the race track brake pad wear model 82. The estimation begins in block 56 in which a required braking energy to be dissipated by the vehicle braking system 16 is determined as a fraction of the total vehicle kinetic energy according to an energy partitioning model, also referred to as a brake system/road load energy partition model 56. In other words, the vehicle energy to be braked is partitioned between the braking system 16 and other systems that can dissipate the energy. Brake system/road load energy partition model 56 models aerodynamic drag, tire losses, and powertrain braking losses based on vehicle speed, lateral acceleration, and gear selection. Various vehicle operating conditions are considered, such as the transmission gear ratio 70, vehicle speed 72, and the braking energy 38. As discussed herein, the transmission gear ratio 70 correlates with the amount of energy that can be dissipated by engine braking. The vehicle speed 72 is used to determine the amount of energy dissipated by aerodynamic drag on the vehicle 10. First, the aerodynamic force on the vehicle 10 is determined as follows:

$$\text{Aero Force} = \frac{1}{2}C_d \times \rho \times A \times V^2 \tag{9}$$

where $C_d$ is the aerodynamic drag coefficient, $\rho$ is air density, A is the vehicle cross sectional area, and V is vehicle velocity. The aerodynamic drag coefficient $C_d$, air density $\rho$, and vehicle cross sectional area A may be constants stored in the processor 24. Alternatively, air density $\rho$ can be varied according to a sensed air temperature.

The powertrain force is then determined according to the formula:

$$\text{Powertrain Force} = \text{Gear}_{Trans} \times \text{Gear}_{Axle} \times \text{Torque}_{Engine,Motoring} \times R_{tire} \tag{10}$$

where $\text{Gear}_{Trans}$ is the transmission gear ratio, determined from a lookup table of gear ratios according to the current gear ratio 70; $\text{Gear}_{Axle}$ is the drive axle ratio, also determined from a stored lookup table; $\text{Torque}_{Engine,Motoring}$ is the engine motoring torque, determined from a stored lookup table of engine speed and throttle position; and $R_{tire}$ is the radius of each tire 15.

Next, the tire force is determined according to the formula:

$$\text{Tire Force} = K(V) \times \text{Slip Angle} \tag{11}$$

where K is an empirically-determined coefficient relating tire losses to vehicle slip angle and vehicle speed; and Slip Angle is the vehicle overall slip angle, as may be indicated by a signal from a chassis controls portion of the processor 24.

With these values determined, the processor 24 can then calculate the portion of vehicle kinetic energy to be dissipated by the braking system 16 according to the ratio:

$$\text{Braking}_{Fraction} = \frac{\text{Total Decel Force} - \text{Aero Force} - \text{Powertrain Force} - \text{Tire Force}}{\text{Total Decel Force}} \tag{12}$$

where Total Decel Force is the force according to Equation (8).

Following block 56, the algorithm 24 proceeds to block 74, in which vehicle dynamics are modeled according to the high energy vehicle operating parameters of the race track mode, and the required braking energy is then distributed to the braking mechanisms 18A, 18B, 18C, 18D at the wheels 14A, 14B, 14C, 14D according to the modeled vehicle dynamics. First, the change in the front-rear weight distribution of the vehicle 10 in the race track mode, $\Delta W$, is calculated according to the formula:

$$\Delta W = \text{Weight}_{Total} \times A_X \times \frac{CG}{WB} \tag{13}$$

where CG is the center of gravity height; WB is the wheelbase height, and $A_X$ is the fore-aft vehicle acceleration (i.e., longitudinal acceleration 78).

The front-rear weight distribution in the vehicle 10 is then calculated as follows:

$$W_{front} = W_{front,static} + \Delta W \tag{14}$$

$$W_{rear} = W_{rear,static} - \Delta W \tag{15}$$

where $W_{Front,Static}$ is the static weight over the front axle, and $W_{Rear,Static}$ is the static weight on the rear axle.

The left-right weight distribution is then determined as follows:

$$\frac{\Delta W_F}{A_Y} = \frac{W_S}{t_F}\left[\frac{h_2 K_{F\prime}}{K_F + K_R - W_S h_2} + \frac{l - a_s}{l} Z_{RF}\right] + \frac{W_{uF}}{t_F} z_{WR} \tag{16}$$

$$\frac{\Delta W_R}{A_Y} = \frac{W_S}{t_R}\left[\frac{h_2 K_{R\prime}}{K_F + K_R - W_S h_2} + \frac{a_s}{l} Z_{RR}\right] + \frac{W_{uR}}{t_R} z_{WR} \tag{17}$$

where $\Delta W_F$, $\Delta W_R$ is the change in lateral distribution of weight between the left and right of the vehicle 10; $A_Y$ is the lateral acceleration (i.e., lateral acceleration 76); $W_S$ is the sprung weight at height $h_S$ and perpendicular distance $h_2$ from the Neutral Roll Axis; $W_{uF}$ and $W_{uR}$ are the front and rear unsprung weights at heights $z_{WS}$ and $z_{WR}$, respectively; $K_F$, $K_R$ are the front and rear suspension roll rates, respectively; $a_s$ is the distance between the front roll center and the sprung mass center of gravity; and $$K_{F\prime} = K_F - (1 - a_S)\frac{W_S h_2}{l} \tag{18}$$

$$K_{R\prime} = K_R - \frac{a_S W_S h_2}{l} \tag{19}$$

The vehicle dynamics model of block 74 then determines whether the square root of the sum of the lateral acceleration squared and the longitudinal acceleration squared is greater than a predetermined traction threshold. That is, block 74 determines whether the following is true:

$$\sqrt{A_Y^2 + A_X^2} > \text{Traction\_Threshold} \tag{20}$$

The parameter Traction_Threshold equates loosely with the "traction circle" limit for the vehicle's tires, and will be set at a level above which exceeding the traction available at one or more wheel locations becomes likely. A typical value would be 0.7, and it would be tunable in vehicle development.

If not, braking energy is distributed according to the standard brake pad wear model of block 58, i.e., according to the following:

$$\text{Braking Energy Fraction Front} = \frac{A_{piston,front} R_{effective,front} \mu_{front}}{\left(\begin{array}{c} A_{piston,front} R_{effective,front} \mu_{front} + \\ A_{piston,rear} R_{effective,rear} \mu_{rear} \end{array}\right)}; \tag{21}$$

and $$\text{Braking Energy Fraction Rear} = (1 - \text{Braking Energy Fraction Front}) \tag{22}$$

However, if the square root of the sum of the lateral acceleration squared and the longitudinal acceleration squared is greater than the predetermined traction threshold, then the braking energy is distributed according to available vertical force at each wheel 14A, 14B, 14C, 14D. For example, for a combined braking and right-hand turn, where Traction_Threshold is exceeded in Equation 20 above, block 74 calculates:

$$W_{left\_front} = W_{front} + \Delta W_F, \text{ as the weight at wheel } 14A; \tag{23}$$

$$W_{right\_front} = W_{front} - \Delta W_F, \text{ as the weight at wheel } 14B; \tag{24}$$

$$W_{left\_rear} = W_{rear} + \Delta W_R, \text{ as the weight at wheel } 14C; \tag{25}$$

and $$W_{left\_rear} = W_{rear} - \Delta W_R, \text{ as the weight at wheel } 14D. \tag{26}$$

The braking energy computed from the energy portioning model of block 56 is apportioned to each brake corner according to the fraction of the total vehicle mass. For example, if:

$$\frac{W_{left\_front}}{W_S} = 40\%,$$

then 40% of the total braking energy is routed into the left front brake corner.

Following block 74, the algorithm 24 proceeds to block 80 to determine rotor temperature according to a lookup table of stored experimental data relating braking energy to rotor temperature, such as from testing on a vehicle dynamometer. The look-up table is determined the same as according to block 36, but with: (i) braking energy apportioned to the wheels 14A-14D according to the above formulas to more accurately determine rotor temperature at each wheel 14A-14D under the high energy, race track mode vehicle operating conditions, and (ii) reduced cooling coefficients b in equation (1) the lumped capacitance model for brake rotor cooling. The reduced cooling coefficients in the second (higher temperature) driving mode (i.e., the race track driving mode) are due to changes in brake rotor material thermal properties (increase in specific heat capacity in particular) and convective cooling behavior. Example measurements show a 6% reduction in high temperature brake cooling coefficients (starting temperature above 600 degrees Celsius) versus lower temperature brake cooling coefficients (starting temperature around 400 degrees Celsius).

Next, the algorithm 26 relates rotor temperature determined according to the race track rotor temperature model 80 to brake pad wear in the race track brake pad wear model 82. The estimated rotor temperature determined for a particular time step of the algorithm 26 according to the race track rotor temperature model 80 and the braking energy from the vehicle dynamics model 74 at each wheel 14A-14D during that time step are inputs to the race track brake pad wear model 82. The inputs are related to experimental testing data stored in a look-up table or to a fitted equation of volumetric wear per unit of braking energy input, which may be in cubic millimeters per Kilojoule versus temperature in degrees Celsius. The correlation provides an estimated volumetric wear of the brake pad 22 during that time step. Linear wear can then be tracked according to the race track brake pad wear model 82 that also accounts for the properties of the brake pad 22. More specifically, linear wear of a respective one of the brake pads 22 is calculated as:

$$\text{Wear}_{linear} = \frac{\sum_{t=0}^{t} \text{Wear}_{timestep}}{\text{Area}_{Pad}} \quad (27)$$

Figure 4:
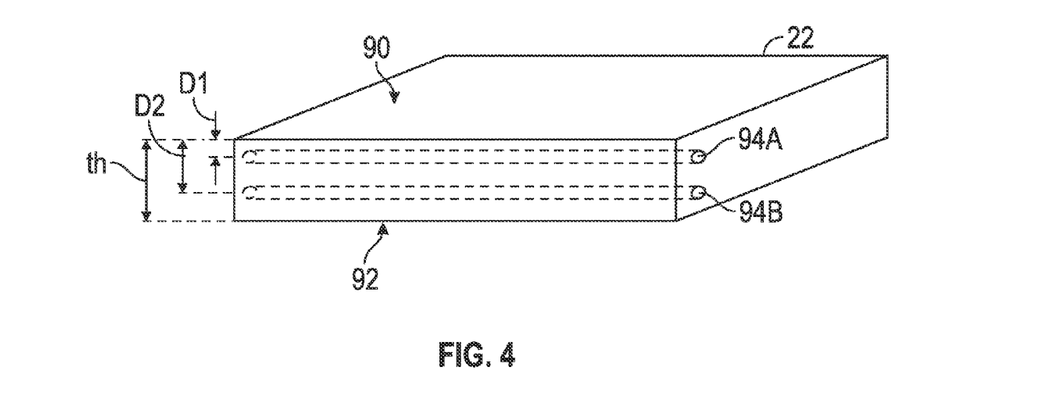
FIG. 4 is a schematic illustration of a brake pad with indicators correlated with predetermined amounts of wear.

FIG. 4 shows a brake pad 22 with an initial thickness th and a direction of linear wear from an upper surface 90 to a lower surface 92 that is secured to the brake rotor 20. Each time the algorithm 24 calculates the wear of each brake pad 22, whether under the standard brake pad wear model 58 or the race track brake pad wear model 82, the wear is added to previous calculations of wear over time, and the remaining mileage for each brake pad 22 can be extrapolated from vehicle mileage and the initial thickness of the brake pad 22.

In FIG. 4, the brake pad 22 is shown with two physical wear sensors 94A, 94B each of which is operatively connected to the controller C. The physical wear sensors 94A, 94B are in the form of wires embedded at different predetermined depths in the brake pad 22. Other types of brake sensors could instead be used, such as an indirect sensor or sensing mechanism to infer the brake pad thickness. Suitable examples include brake fluid level sensors or measuring the displacement of the brake calipers, such as in an electro-mechanical or brake-by-wire system. When the brake pad 22 linear wear reaches the depth D1 of the first physical wear sensor 94A, the physical wear sensor 94A will cause a signal 86A to the controller C, either by breaking or by making contact with the rotor 20. Similarly, when the brake pad 22 linear wear reaches the depth D2 of the second physical wear sensor 94B, the second physical wear sensor 94B will cause a signal 86B to be sent to the controller C. These signals from the sensors 94A, 94B are indicative of specific, actual brake pad thicknesses and can be used to gradually ramp out any differences between the estimation of the brake pad thickness from the brake pad wear models 58 or 82, and the actual thickness over the remaining pad thickness and life.

Accordingly, after estimating brake pad wear according to the standard brake pad wear model 58 or according to the race track brake pad wear model 82, the algorithm 24 proceeds to the wear correction model 84. If a signal from the first physical wear sensor 94A has not yet been received, then no correction to the estimated brake pad wear is made. The algorithm 24 then proceeds to box 94 under which a brake pad wear signal or indication is produced and provided to the vehicle operator via the brake pad wear indicator output device 35 of FIG. 1, indicating the amount of estimated brake pad wear or the amount of remaining brake pad life, which is correlated with the remaining brake pad thickness determined from the estimated brake pad wear.

If the wear correction model 84 has received a physical wear sensor signal 86A from the first physical wear sensor 94A, the estimated brake pad wear is compared to the predetermined brake pad wear (i.e., wear of linear thickness D1). If a significant difference exists between the estimate and the actual thickness, as determined when the sensor signal 86A or 86B is received, then this difference is used to adjust (i.e., correct) the estimated brake pad wear so that when the pad 22 is near the replacement period, or near the depth D2 of the next physical wear sensor 94B, the total system accuracy will be as high as possible. This will involve increasing or decreasing the estimate of the pad life remaining at a rate different from that observed so that the end of the life of the pad 22 will be accurately determined.

The algorithm 26 then proceeds to block 94 to provide an indication of brake pad wear or of remaining brake pad life to the vehicle operator. The algorithm 26 then proceeds to block 36, and then to the switching model 42 and, after a predetermined time period, again determines whether vehicle operating conditions indicate that the standard brake pad wear model 58 or the race track brake pad wear model 82 should be applied. As the algorithm 24 repeats, when the controller C subsequently receives a physical wear sensor signal 86A from the second physical wear sensor 94B, the wear correction model 84 again adjusts the estimated brake pad wear models 58, 82.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of estimating brake pad wear on a vehicle, the method comprising:
    determining, via an electronic controller, required braking energy to be dissipated by a braking system of the vehicle as a fraction of total kinetic energy of the vehicle according to an energy partitioning model;
    determining, via the electronic controller, a distribution of the required braking energy to multiple vehicle braking mechanisms on the vehicle according to a vehicle dynamics model; wherein the vehicle dynamics model:
        determines whether the square root of the sum of the square of lateral acceleration of the vehicle and the square of longitudinal acceleration of the vehicle is greater than a predetermined traction threshold, and
        distributes braking energy according to available vertical force at each wheel of the vehicle if the square root of the sum of the square of lateral acceleration of the vehicle and the square of longitudinal acceleration of the vehicle is greater than the predetermined traction threshold;
    wherein each of the multiple vehicle braking mechanisms has a brake rotor and a brake pad;
    determining, via the electronic controller, rotor temperature of each brake rotor according to a rotor temperature model that utilizes the required braking energy and the distribution of the required braking energy;
    determining, via the electronic controller, brake pad wear of each brake pad according to a brake pad wear model;
    indicating the brake pad wear via a brake pad wear indicator output device; and
    wherein the energy partitioning model, the vehicle dynamics model, the rotor temperature model, and the brake pad wear model are representative of vehicle conditions when the rotor temperature is greater than a predetermined minimum rotor temperature, braking speed is greater than a predetermined minimum braking speed, and the required braking energy is greater than a predetermined minimum braking energy;
    wherein the energy partitioning model, the vehicle dynamics model, the rotor temperature model and the brake pad model are utilized for said determining the required braking energy to be dissipated, determining the distribution of the required braking energy, determining the rotor temperature, and determining the brake pad wear, respectively, only when the predetermined minimum rotor temperature and the predetermined minimum braking speed are exceeded a predetermined number of times within a predetermined time period, or the braking energy exceeds the predetermined minimum braking energy for a predetermined minimum period of time; and
    wherein an alternative brake pad wear model is utilized when the predetermined minimum rotor temperature and the predetermined minimum braking speed are not exceeded the predetermined number of times within the predetermined time period, and the braking energy does not exceed the predetermined minimum braking energy for the predetermined minimum period of time.

2. The method of claim 1, wherein the energy partitioning model, the vehicle dynamics model, the rotor temperature model and the brake pad model are utilized for said determining the required braking energy to be dissipated, determining the distribution of the required braking energy, determining the rotor temperature, and determining the brake pad wear, respectively in response to operator selection even if the predetermined minimum rotor temperature and the predetermined minimum braking speed are not exceeded the predetermined number of times within the predetermined time period, and even if the braking energy does not exceed the predetermined minimum braking energy for the predetermined minimum period of time.

3. The method of claim 1, wherein the predetermined minimum rotor temperature is representative of vehicle operation in a first driving mode; wherein the rotor temperature model is representative of vehicle operation in a second driving mode; and wherein braking speeds and braking energy in the second driving mode are greater than braking speeds and braking energy in the first driving mode.

4. The method of claim 3, wherein the rotor temperature model used in the second driving mode includes a lumped capacitance model of rotor specific heat capacity with cooling coefficients less than cooling coefficients used in the first driving mode.

5. The method of claim 1, wherein the brake pad wear model determines an amount of linear wear of each brake pad per a predetermined amount of time by reference to stored linear wear data or by reference to a fitted linear wear equation.

6. The method of claim 1, wherein the energy partitioning model is based at least partially on gear ratio, vehicle speed, and braking energy.

7. The method of claim 1, further comprising:
    receiving a sensor signal indicative of a predetermined amount of actual brake pad wear;
    comparing brake pad wear determined according to the brake pad wear model to the predetermined amount of actual brake pad wear; and
    revising the brake pad wear model wear based on the comparison to the predetermined amount of actual brake pad wear.

8. A method of estimating brake pad wear on a vehicle, the method comprising:
    determining, via an electronic controller, brake pad wear according to a first brake pad wear model when an estimated brake rotor temperature is less than or equal to a predetermined minimum rotor temperature; and
    determining, via the electronic controller, brake pad wear according to a second brake pad wear model different than the first brake pad wear model, when the estimated brake rotor temperature is greater than the predetermined minimum rotor temperature;
    wherein said determining, via the electronic controller, brake pad wear according to the second brake pad wear model includes:
        determining, via the electronic controller, required braking energy to be dissipated by a braking system of the vehicle as a fraction of total kinetic energy of the vehicle according to an energy partitioning model; and
        determining, via the electronic controller, a distribution of the required braking energy to multiple vehicle braking mechanisms on the vehicle according to a vehicle dynamics model; wherein the vehicle dynamics model determines whether the square root of the sum of the square of lateral acceleration of the vehicle and the square of longitudinal acceleration of the vehicle is greater than a predetermined traction threshold and, distributes braking energy according to available vertical force at each wheel of the vehicle if the square root of the sum of the square of lateral acceleration of the vehicle and the square of longitudinal acceleration of the vehicle is greater than the predetermined traction threshold;

wherein each of the multiple vehicle braking systems has a brake rotor and a brake pad;

wherein the second rotor temperature model utilizes the required braking energy and the distribution of the required braking energy;

wherein the second rotor temperature model and the second brake pad wear model are representative of vehicle conditions when the rotor temperature is greater than a predetermined minimum rotor temperature, braking speed is greater than a predetermined minimum braking speed, and the required braking energy is greater than a predetermined minimum braking energy; and indicating the brake pad wear via a brake pad wear indicator output device.

9. The method of claim 8, wherein said determining brake pad wear according to the first brake pad wear model is only when braking speed is less than or equal to the predetermined minimum braking speed, and the required braking energy is less than or equal to the predetermined minimum braking energy; and wherein said determining brake pad wear according to the second brake pad wear model is only when the braking speed is greater than the predetermined minimum braking speed, and the required braking energy is greater than the predetermined minimum braking energy.

10. The method of claim 9, wherein the second brake pad wear model is utilized only when the predetermined minimum rotor temperature and the predetermined minimum braking speed are determined to be exceeded a predetermined number of times within a predetermined time period, or the braking energy exceeds the predetermined minimum braking energy for a predetermined minimum period of time.

11. The method of claim 10, wherein the second brake pad wear model is further utilized when commanded by a vehicle operator even if the predetermined minimum rotor temperature and the predetermined minimum braking speed are not exceeded the predetermined number of times within the predetermined time period, and even if the braking energy does not exceed the predetermined minimum braking energy for the predetermined minimum period of time.

12. The method of claim 8, wherein the first brake pad wear model utilizes the estimated brake rotor temperature as determined according to a first rotor temperature model; and wherein the second brake pad wear model utilizes the estimated brake rotor temperature as determined according to a second rotor temperature model.

13. A vehicle comprising:
a vehicle body operatively connected to rotatable wheels for moving the vehicle body;
a braking system configured to stop rotation of the wheels;
wherein the braking system includes respective braking mechanisms each operatively connected with a different respective one of the wheels, each having a brake rotor rotatable with the wheel and a brake pad placed in contact with the brake rotor during braking of the wheel;
a brake pad wear indicator output device; and
an electronic controller having a processor that executes a stored algorithm that:
determines brake rotor temperature;
determines brake pad wear according to a first brake pad wear model when the brake rotor temperature is less than or equal to a predetermined minimum rotor temperature, which includes;
determining brake pad wear according to a second brake pad wear model when the brake rotor temperature is greater than the predetermined minimum rotor temperature; and
determining required braking energy to be dissipated by the braking system as a fraction of total kinetic energy of the vehicle according to an energy partitioning model; and
determining a distribution of the required braking energy to the braking mechanisms according to a vehicle dynamics model;
wherein the brake rotor temperature is determined according to a rotor temperature model that utilizes the required braking energy and the distribution of the required braking energy;
wherein the energy partitioning model, the vehicle dynamics model, the rotor temperature model, and the second brake pad wear model are representative of vehicle conditions when the rotor temperature is greater than the predetermined minimum rotor temperature, braking speed is greater than a predetermined minimum braking speed, and the required braking energy is greater than a predetermined minimum braking energy;
wherein the vehicle dynamics model determines whether the square root of the sum of the square of lateral acceleration of the vehicle and the square of longitudinal acceleration of the vehicle is greater than a predetermined traction threshold and, distributes braking energy according to available vertical force at each wheel of the vehicle if the square root of the sum of the square of lateral acceleration of the vehicle and the square of longitudinal acceleration of the vehicle is greater than the predetermined traction threshold; and
indicates the brake pad wear via the brake pad wear indicator output device.

14. The vehicle of claim 13, further comprising:
an operator input device operatively connected to the controller and configured to receive operator input to thereby select determination of brake pad wear according to either the first brake pad wear model or the second brake pad wear model independent of the predetermined minimum rotor temperature, the predetermined minimum braking speed and the predetermined minimum braking energy.

\* \* \* \* \*